106. COMPOSITIONS,
94 COATING OR PLASTIC.

848,328

UNITED STATES PATENT OFFICE.

MAXIMILIAN TOCH, OF NEW YORK, N. Y.

CEMENT AND PROCESS OF MANUFACTURING SAME.

No. 848,328. Specification of Letters Patent. Patented March 26, 1907.

Application filed October 23, 1906. Serial No. 340,144.

*To all whom it may concern:*

Be it known that I, MAXIMILIAN TOCH, a citizen of the United States, and a resident of the city of New York, in the county and State of New York, have invented certain new and useful Improvements in Cement and Processes of Manufacturing Same, of which the following is an exact description.

My new cement after setting is impervious against moisture and free from voids or pores. Heretofore Portland cement, which is a tricalcic silicate mixed with an aluminate of lime in the proportions of eighty-five per cent. $SiO_2 3CaO$ and fifteen per cent. $Al_2O_3 2CaO$ in the state of a solid solution, and which may also be a tricalcic silicate dissolved with a calcium ferrite, $Fe_2O_3 2CaO$, shows voids or pores after setting when examined under the microscope. It is obvious that moisture is liable to enter through these holes, and thus cause injury to the structure. By means of my invention, which consists in combining Portland cement with a resinate of an acid resin and a silicate of alumina, I produce a cement free from these voids, and buildings erected with my cement are waterproof. If a small sample of the cement concrete after being finely ground is treated in a test-tube with carbon bisulfid for about five minutes and the liquid is then filtered off the filtrate after evaporation will leave behind a resinous film.

In carrying out my process practically I can proceed as follows: Fifty pounds of dry Manila copal and fifty pounds of dry slaked lime are ground together very finely for about eight hours. In this manner a lime resinate containing more or less of the free raw material is produced. Time and heat being equivalents here, as in most chemical reactions, the raw materials employed—namely, Manila copal and slaked lime—may also be heated together. If, for example, the above quantities are employed and a temperature of 550° Fahrenheit is selected, the mass need only be heated for one and one-half hours to complete the formation of the desired amount of the resinate. The resinate, whether prepared at ordinary temperature or by the use of heat, is reduced to a very fine powder and is then mixed with fifty pounds of silicate of alumina for one hundred pounds of the resinate. As silicate of alumina I prefer to use the best English clay. The powder thus obtained, in combination with Portland cement, furnishes my new cement. This new cement is prepared by employing for forty pounds of Portland cement ten pounds of the above powder. When this new cement is applied in the arts as Portland cement is, then the cement concrete (beton) shows no voids or pores under the microscope, and buildings erected with my new material are waterproof.

Instead of Manila copal other acid resins may be employed. In fact, I do not wish to be understood as excluding from my claims equivalents for the ingredients, the apparatus, or the operations employed in the process. It is probable that substitutes may be employed without departing from the scope of the process intended to be secured hereby.

Having now described my invention and in what manner the same is to be performed, what I claim as new, and desire to secure by Letters Patent, is—

1. The new cement, obtainable from ordinary cement in combination with a resinate of an acid resin and silicate of alumina, free from voids or pores in the cement-concrete, from which bisulfid of carbon extracts resinous matter, substantially as hereinbefore described.

2. The new cement, obtainable from ordinary cement in combination with the lime resinate of an acid resin and silicate of alumina, free from voids or pores in the cement-concrete, from which bisulfid of carbon extracts resinous matter, substantially as hereinbefore described.

3. The new cement, obtainable from ordinary cement in combination with the lime resinate of Manila copal and silicate of alumina, free from voids or pores in the cement-concrete, from which bisulfid of carbon extracts resinous matter, substantially as hereinbefore described.

4. The process of making a new cement by combining a resinate of an acid resin with silicate of alumina and ordinary Portland cement, substantially as hereinbefore described.

5. The process of making a new cement by combining the lime resinate of an acid resin with silicate of alumina and ordinary Portland cement, substantially as hereinbefore described.

6. The process of making a new cement by combining the lime resinate of Manila copal with silicate of alumina and ordinary Portland cement, substantially as hereinbefore described.

7. The new compounds, obtainable from a resinate of an acid resin, in combination with a silicate of alumina which, when added to Portland cement, gives a cement-concrete, free from voids and pores, and from which bisulfid of carbon extracts resinous matter, substantially as hereinbefore described.

8. The new compounds, obtainable from the lime resinate of an acid resin, in combination with a silicate of alumina which, when added to Portland cement, gives a cement-concrete, free from voids and pores, and from which bisulfid of carbon extracts resinous matter, substantially as hereinbefore described.

9. The new compound, obtainable from the lime resinate of Manila copal, in combination with a silicate of alumina which, when added to Portland cement, gives a cement-concrete, free from voids and pores, and from which bisulfid of carbon extracts resinous matter, substantially as hereinbefore described.

10. The process of producing a new composition of matter by combining a resinate of an acid resin with silicate of alumina, substantially as hereinbefore described.

11. The process of producing a new composition of matter by combining the lime resinate of an acid resin with silicate of alumina, substantially as hereinbefore described.

12. The process of producing a new composition of matter by combining the lime resinate of Manila copal with silicate of alumina, substantially as hereinbefore described.

MAXIMILIAN TOCH.

Witnesses:
  O. M. KOHN,
  CHARLES E. KRANBERG.